United States Patent Office 3,639,636
Patented Feb. 1, 1972

3,639,636
METHOD OF LOWERING SERUM CHOLESTEROL
James W. Barnhart, Indianapolis, Ind., assignor to The Dow Chemical Company, Midland, Mich.
No Drawing. Filed June 1, 1967, Ser. No. 642,682
Int. Cl. A61k 27/00
U.S. Cl. 424—346                 7 Claims

ABSTRACT OF THE DISCLOSURE

Methods useful for lowering serum cholesterol in animals comprising administration to the animal of an effective amount of a tetraalkylbiphenol compound, preferably 2,2',6,6'-tetra-tert-butyl-p,p'-biphenol, and compositions to be employed in practicing the method.

---

This invention relates to novel compositions and methods for using the same for reducing the concentration of cholesterol in the blood of animals. More particularly, the invention is directed to new pharmaceutical compositions and methods for using the same to reduce cholesterol levels in the blood of vertebrate animals wherein the compositions contain a hypocholesteremic amount of a tetraalkylbiphenol compound.

It is an object of this invention to provide novel compositions which have the effect of lowering blood cholesterol upon the administration of such compositions to animals. A further object of this invention is to provide a novel method for lowering blood cholesterol in animals. A further object of this invention is to provide novel compositions which have the effect of lowering blood cholesterol in warm-blooded animals and which have low toxicity and little or no pharmacological effects in other areas at dosage levels consistent with good hypocholesteremic or cholesterol-lowering activity. It is a further object of this invention to provide novel compositions which have the effect of lowering blood cholesterol in animals and which exert little or no estrogenic effect at dosage levels consistent with good hypocholesteremic activity. A further object of the invention is to provide a method and compositions useful for the alleviation of hypercholesteremia in mammals.

It has been found that the serum cholesterol level of warm-blooded animals may be lowered by administering to the animal a hypocholesteremic amount of a tetraalkylbiphenol compound corresponding to one of the formulae

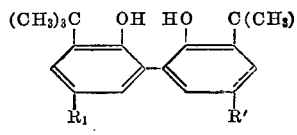

(I)

and

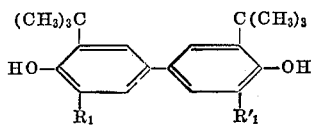

(II)

or of a suitable composition or dosage form containing as the active ingredient a hypocholesteremic amount of at least one such tetraalkylbiphenol compound. In the present specification and claims, R and R' each independently represent methyl, ethyl, isopropyl or tertiary butyl and $R_1$ and $R'_1$ each independently represent tertiary butyl or isopropyl. The compounds wherein R, R', $R_1$ and $R'_1$ are tert-butyl are particularly preferred for use in the compositions and method of the invention.

For the sake of convenience, the tetraalkylbiphenol compounds having the above-described chemical structures will be referred to hereinafter as "TABP" compounds.

It has been found that the TABP compounds used in accordance with the invention, when administered to animals and in particular to mammals, have the effect of lowering the serum cholesterol content, that is, the amount of cholesterol in the blood serum of the animal to which is administered the active compounds of the invention. The TABP compounds are preferably administered as compositions in dosage unit form. Such compositions can be prepared by known techniques, for example, tableting or encapsulation. The compounds can also be prepared as sterile injectable compositions in dosage unit form. The doseage units preferably contain from about 200 milligrams to about 5 grams of the active ingredient. The compounds can also be administered as compositions adapted to be fed as part or all of the animal diet.

In forming the compositions of the invention, the active TABP compound is incorporated in a non-toxic carrier. In the present specification and claims, the term "non-toxic carrier" refers to conventional veterinary or pharmaceutical excipients which are substantially non-toxic and non-sensitizing at dosages consistent with good hypocholesteremic activity. The compositions generally contain from about 20 to about 95 percent of the TABP compound. Solid compositions can contain as little as about 20-50 percent or as much as 40-95 percent of the active TABP compound. The liquid compositions generally contain from about 20 to about 60 percent of the TABP compound.

The active TABP compounds can be incorporated in solid non-toxic carriers for administration in the form of tablets, capsules or dispersible powders. Suitable solid non-toxic carriers which can be employed in formulating the solid compositions include starch, lactose, glucose, sucrose, gelatin, gum tragacanth, chalk, magnesium carbonate, magnesium stearate and the like and compatible mixtures thereof. The active TABP compounds can also be formulated as liquid compositions such as emulsions, suspensions, syrups and elixirs and the like. Emulsions are formulated with solutions of the active ingredient in an oil such as sunflower seed oil, corn oil, cod-liver oil and the like constituting the oil phase. The emulsions are prepared with the aid of emulsifying agents such as lecithin, gum acacia, gum tragacanth, sorbitan trioleate and polyoxyethylene sorbitan monooleate. The suspension formulations are prepared by suspending the active TABP compound with the aid of wetting agents and suspending agents. The suspending agents can include cellulose derivatives such as hydroxypropylmethyl cellulose, methyl cellulose and carboxymethyl cellulose. Suitable wetting agents include polyethylene oxide condensation products of alkylphenols, fatty alcohols or fatty acids. The suspensions and emulsions are generally prepared in water as a non-toxic liquid carrier. However, the compositions can also include glucose syrup, ethanol, glycerine, saline and the like.

The compositions can also include preservatives, antioxidants, flavoring agents, sweetening agents and coloring materials.

The TABP compounds can also be incorporated in a foodstuff such as, for example, butter, margarine, edible oils and the like. The TABP compounds can also be prepared in the form of a nutritive composition in which the active ingredient is mixed with vitamins, fats, proteins or carbohydrates and the like, or mixtures thereof. The nutritive compounds are adapted to be administered as the total diet, as a part of the diet or as a supplement to the diet. The nutritive compositions preferably contain from about 0.02 to about 2 percent of the active compound when administered as the total diet. The compositions can selected from the group consisting of compounds of the formulae

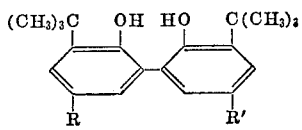

(I)

and

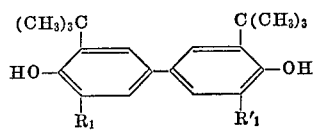

(II)

wherein R and R' each represent the same member of the group consisting of methyl, ethyl, propyl and butyl and $R_1$ and $R'_1$ each represent the same member of the group consisting of isopropyl and tert-butyl in an amount of from 10 to 1000 milligrams of compound per kilogram of animal body weight per day.

2. The method of claim 1 wherein the compound is 2,2',6,6'-tetra-tert-butyl-p,p'-biphenol.

3. The method of claim 1 wherein the compound is 6,6'-di-tert-butyl-4,4'-dimethyl-o,o'-biphenol.

4. The method of claim 1 wherein the compound is 4,4',6,6'-tetra-tert-butyl-o,o'-biphenol.

5. The method of claim 1 wherein the compound is 2,2'-di-tert-butyl-6,6'-diisopropylbiphenol.

6. A method for lowering serum cholesterol in animals comprising administering orally to an animal having a high serum cholesterol level the compound 2,2',6,6'-tetra-tert-butyl-p,p'-biphenol in a hypocholesteremic amount sufficient to provide a reduction in serum cholesterol content.

7. A method for lowering serum cholesterol in animals comprising administering orally to an animal having a high serum cholesterol level the compound 4,4',6,6'-tetra-tert-butyl-0,0'-biphenol in a hypocholesteremic amount sufficient to provide a reduction in serum cholesterol content.

References Cited
UNITED STATES PATENTS

| | | | |
|---|---|---|---|
| 2,785,188 | 3/1957 | Coe | 260—620 X |
| 2,835,564 | 5/1958 | Coe | 260—620 X |
| 3,247,262 | 4/1966 | Kaeding | 260—620 |
| 2,532,233 | 11/1950 | Johnson et al. | 424—346 |
| 3,279,922 | 10/1960 | Jaworski | 99—8 X |

FOREIGN PATENTS 1,088,455  10/1967  Great Britain.

OTHER REFERENCES

Chemical Abstracts, vol 64: 7979d, March 1966.
Bickoff et al. J. Am. Oil Soc. vol. 32, pp. 64–68, 1955.

STANLEY J. FRIEDMAN, Primary Examiner

L. SCHENKMAN, Assistant Examiner

UNITED STATES PATENT OFFICE
CERTIFICATE OF CORRECTION

Patent No. 3,639,636　　　　　Dated　1 February 1972

Inventor(s)　James W. Branhart

It is certified that error appears in the above-identified patent and that said Letters Patent are hereby corrected as shown below:

Column 1, change the formula between lines 50 and 55 to read:

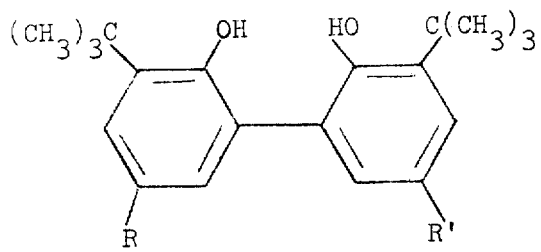

Signed and sealed this 22nd day of August 1972.

(SEAL)
Attest:

EDWARD M. FLETCHER, JR.　　　　　　　ROBERT GOTTSCHALK
Attesting Officer　　　　　　　　　　Commissioner of Patents

Notice of Adverse Decision in Interference

In Interference No. 98,841 involving Patent No. 3,639,636, J. W. Barnhart, METHOD OF LOWERING SERUM CHOLESTEROL, final judgment adverse to the patentee was rendered Nov. 17, 1975, as to claim 6.

[*Official Gazette March 23, 1976.*]